(12) United States Patent
Scott

(10) Patent No.: US 6,850,097 B2
(45) Date of Patent: Feb. 1, 2005

(54) INVERTER

(75) Inventor: Robert John Charles Scott, North Vancouver (CA)

(73) Assignee: Coolit Systems Inc., Calgary (CA)

( * ) Notice: Subject to any disclaimer, the term of this patent is extended or adjusted under 35 U.S.C. 154(b) by 0 days.

(21) Appl. No.: 10/681,225

(22) Filed: Oct. 9, 2003

(65) Prior Publication Data

US 2004/0120170 A1 Jun. 24, 2004

Related U.S. Application Data

(62) Division of application No. 10/016,678, filed on Dec. 17, 2001, now Pat. No. 6,687,142.

(51) Int. Cl.[7] .............................................. G01R 19/00
(52) U.S. Cl. ......................... 327/58; 327/126; 327/131
(58) Field of Search .............................. 327/58, 60, 62, 327/72, 74, 78, 126, 127, 131

(56) References Cited

U.S. PATENT DOCUMENTS

| | | | |
|---|---|---|---|
| 4,128,793 A | 12/1978 | Stich | |
| 4,155,113 A | * 5/1979 | Simmons | ..................... 363/134 |
| 4,446,338 A | 5/1984 | Rosch | |
| 4,597,026 A | * 6/1986 | Santurtun et al. | ............. 363/98 |
| 4,647,905 A | 3/1987 | Hantke et al. | |
| 4,820,940 A | * 4/1989 | Wachi et al. | ................ 327/110 |
| 5,099,138 A | 3/1992 | Fukunaga | |
| 5,251,121 A | 10/1993 | Knodle et al. | |
| 5,355,077 A | 10/1994 | Kates | |
| 5,365,118 A | 11/1994 | Wilcox | |
| 5,402,083 A | 3/1995 | Shekhawat et al. | |
| 5,408,150 A | 4/1995 | Wilcox | |
| 5,469,095 A | 11/1995 | Peppiette et al. | |
| 5,488,323 A | * 1/1996 | Beacham et al. | ............. 327/74 |
| 5,859,519 A | 1/1999 | Archer | |
| 5,969,498 A | 10/1999 | Cooke | |
| 6,107,844 A | 8/2000 | Berg et al. | |
| 6,147,545 A | 11/2000 | Marshall | |
| 6,255,860 B1 | * 7/2001 | Chavez et al. | ................ 327/20 |
| 6,262,618 B1 | 7/2001 | Maggiolini | |
| 6,324,085 B2 | * 11/2001 | Kimura et al. | .............. 363/132 |

* cited by examiner

*Primary Examiner*—Jeffrey Zweizig
(74) *Attorney, Agent, or Firm*—Bennett Jones LLP

(57) ABSTRACT

AC to DC inverters that are formed from electronic switches, such as MOSFETs, that are controlled by gating pulses obtained from comparators. The comparators compare a varying signal against two closely spaced reference voltages so as to provide gating pulses with delays needed to prevent shoot-through in the electronic switches.

4 Claims, 16 Drawing Sheets

INVERTER

This application is a divisional of U.S. patent application Ser. No. 10/016,678, filed Dec. 17, 2001, now U.S. Pat. No. 6,687,142 issued Feb. 3, 2004, incorporated herein by reference.

The invention relates to the field of DC-to-AC inverters and, in particular, to DC-to-AC inverters for use with AC synchronous motors.

BACKGROUND

In many cases it is necessary or desirable to power AC synchronous motors from a single voltage DC supply voltage. Typically, MOSFETs or other electronic switches are used to invert DC to AC power. Conventionally, inverters include driver circuits that require dual polarity supply voltages that may not be readily available in some applications.

Driver circuits must provide protection against shoot-through for the inverter to operate safely and efficiently.

There is a need for a driver circuit that can operate efficiently from a single polarity DC supply voltage with a minimum of components.

DETAILED DESCRIPTION

Figure 1:
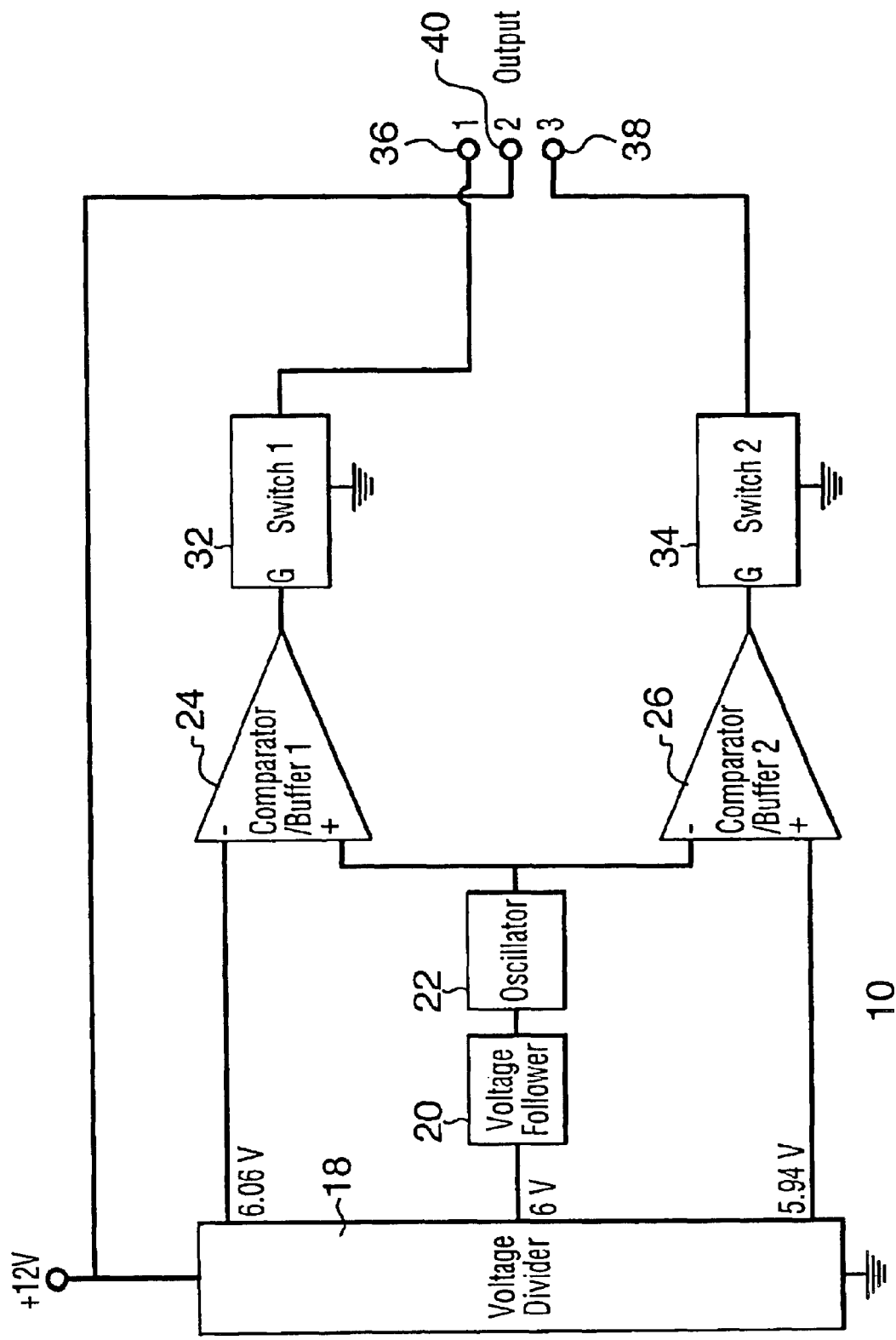
FIG. 1 is a block diagram of one preferred embodiment of the invention.
Figure 2:
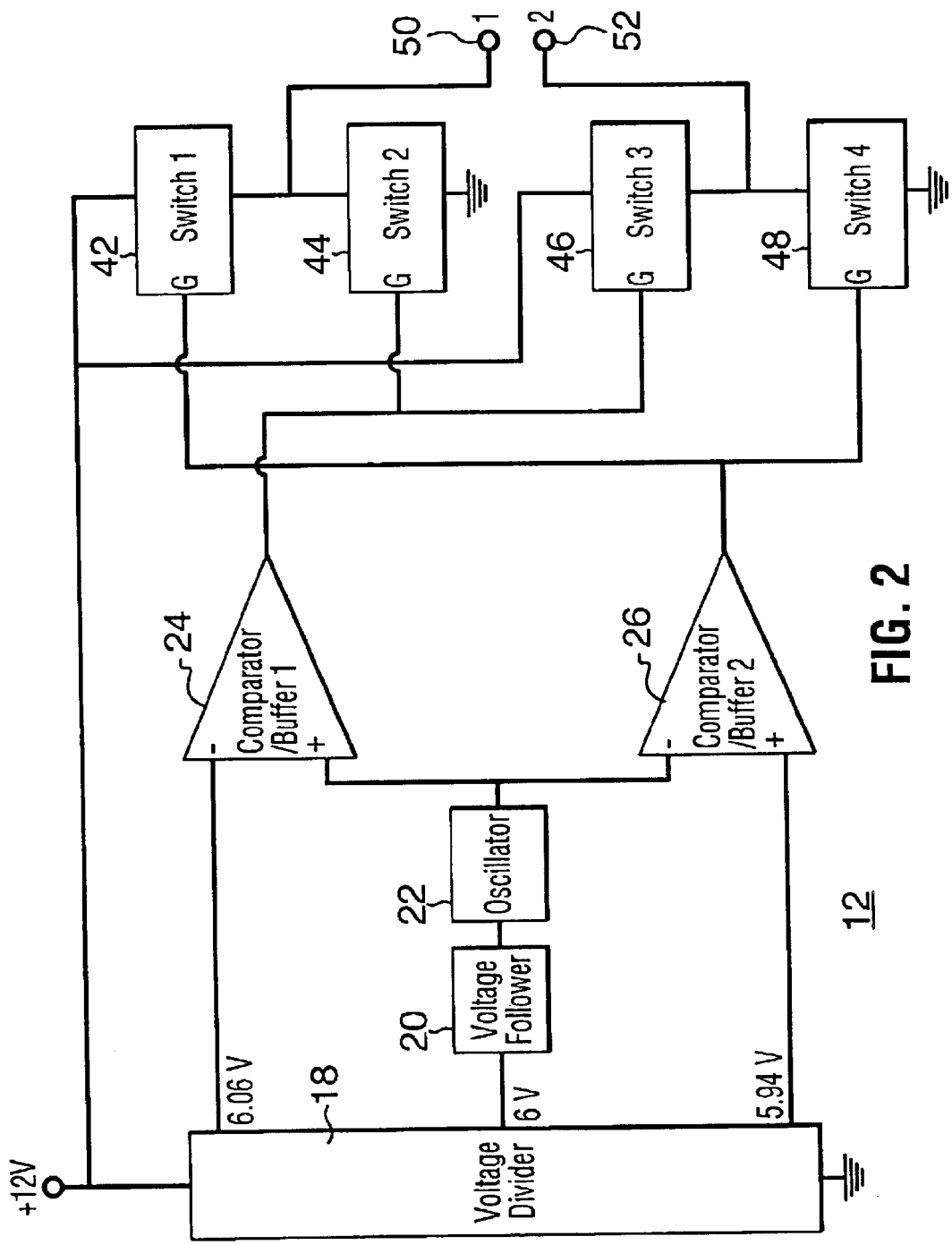
FIG. 2 is a block diagram of a second preferred embodiment of the invention.
Figure 9:
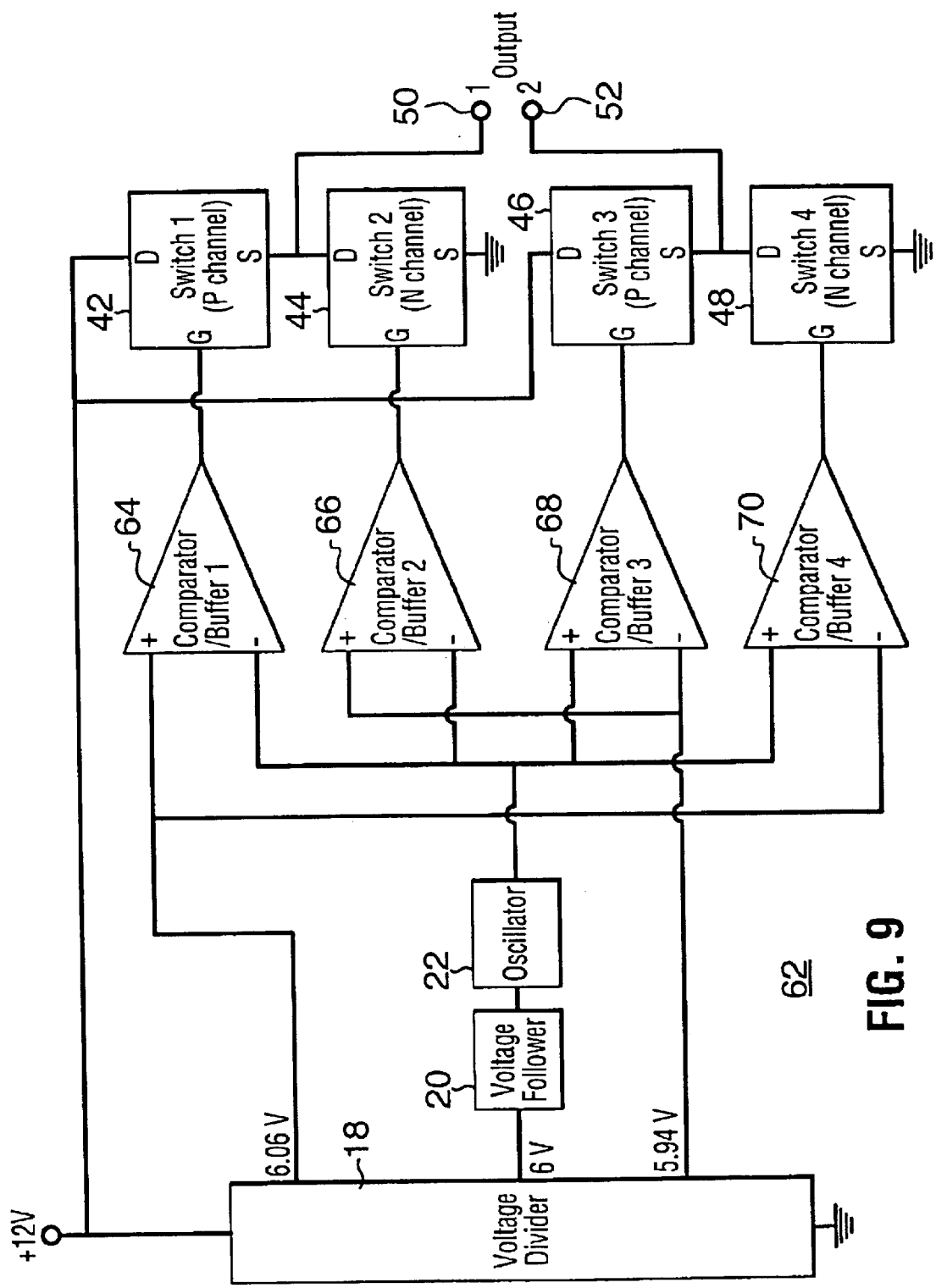
FIG. 9 is a block diagram of a third preferred embodiment of the invention.

The circuits shown in block diagram form in FIGS. 1, 2, and 9 are preferred embodiments of the invention. They are specifically designed to power a small AC synchronous pump operating at a frequency of 60 Hz for use in circulating coolant in a fluid-cooling system for a personal computer, but could be used with advantage for other purposes that will be evident to those skilled in the art. The circuit indicated generally by reference numeral 10 in FIG. 1 is designed to power a pump motor having a center-tapped winding. The circuits indicated generally by reference numeral 12 in FIG. 2, reference numerals 14, 15, 16, and 17 in FIGS. 4A–4D, and reference numeral 62 in FIG. 9 are designed to power a pump motor requiring 60 Hz AC across its winding.

The circuits 10, 12 shown in FIGS. 1 and 2 use what will be referred to herein as "electronic switches". All that is assumed about the electronic switches in the discussion of FIGS. 1 and 2 is that electronic switches have a control terminal indicated by reference letter G, which when a voltage is applied to it closes a connection between two other terminals that are referred to herein as "switched terminals" and keeps the connection closed until the applied voltage stops. FIGS. 1 and 2 are intended to illustrate the overall concept; as will be discussed below, additional circuit elements may be required to be added to FIG. 2 depending upon the type of electronic switch used. Specifically, modified block diagrams for the use of MOSFETs as electronic switches are provided in FIGS. 4A–4D and in FIG. 9.

One limitation of all known electronic switches is that they do not operate instantaneously. For that reason, in many applications a short delay must be provided between the time one switch is turned off and the time another switch is turned on. For example, not providing a delay in the circuit 10 shown in FIG. 1 would cause reduced efficiency in the center-tapped pump motor connected to the output of the circuit because current could flow from the center tap through both halves of the motor winding at the same time in opposite directions if both of the switches were on simultaneously. In the circuits 12, 14, 15, 16, 17, 62 shown in FIGS. 2, 4A–4D, and 9 lack of a delay could cause excessive current through the switches, possibly destroying them, because a current could flow directly through the both pairs of switches to ground without passing through the motor winding if all of the switches were closed long enough. In all circuits a delay is provided by the combination of a voltage divider 18, a voltage follower 20, an oscillator 22, and a first comparator and a second comparator, labeled with reference numerals 24 and 26, respectively, in FIGS. 1 and 2, with reference numerals 28 and 30, respectively, in FIGS. 4A–4D, and with reference numerals 64, 66, 68, and 70 in FIG. 9.

A distinction is drawn between the comparators 24, 26 used in FIGS. 1 and 2 and the comparators 28, 30 used in FIGS. 4A–4D. In the circuit 10, 12 shown in FIGS. 1 and 2, the comparators 24, 26 also function as buffers and are hereinafter referred to as "comparator/buffers 24, 26". For the same reason, the comparators 64, 66, 68, 70 shown in FIG. 9 are hereinafter referred to as "comparator/buffers 64, 66, 68, 70".

In each circuit 10, 12, 14, 15, 16, 17, 62 the voltage divider 18 provides three closely spaced voltages from the DC supply voltage: an offset voltage half-way between the supply voltage and ground and two reference voltages bracketing the offset voltage and differing from it by approximately 1%. Specifically, if the supply voltage is 12 VDC, then the offset voltage is 6 VDC and the reference voltages are 5.94 VDC and 6.06 VDC.

The voltage follower 20 is connected between the offset voltage provided by the voltage divider 18 and the oscillator 22 so as to provide a low impedance 6 VDC source for the oscillator 22. The oscillator 22 is operational amplifier configured as a relaxation oscillator so as to produce a waveform that is approximately a triangular wave signal varying from approximately 4.5 volts to 7.5 volts. In general, the waveforms shown in the drawings and discussed herein are idealizations of the actual waveforms that would be observed in the circuits described herein. In particular, the spacing between the reference voltages shown in FIGS. 5A, 6A, 7A, 8A, and 10A is greatly exaggerated so that the resulting delays are more clearly visible in the drawings.

In all circuits 10, 12, 14, 15, 16, 17, the triangular waveform signal produced by the oscillator 18 is provided to both comparators 24, 26 or comparator buffers 28, 30. In circuits 10, 12 shown in FIGS. 1 and 2, the triangular wave signal is provided to the non-inverting input terminal of the first comparator/buffer 24 and to the inverting input terminal of the second comparator/buffer 26. In the circuit 14 shown in FIG. 4A, the triangular wave signal is provided to the non-inverting input terminal of the first comparator 28 and to the inverting input terminal of the second comparator 30. In the circuit 15 shown in FIG. 4B, the triangular wave is provided to the non-inverting input terminals of both comparators 28, 30. In the circuit 16 shown in FIG. 4C, the triangular wave is provided to the inverting input terminals of both comparators 28, 30. In the circuit 17 shown in FIG. 4D, the triangular wave signal is provided to the inverting input terminal of the first comparator 28 and to the non-inverting input terminal of the second comparator 30. The corresponding connections in circuit 62 shown in FIG. 9 are discussed below.

The input terminal of each of comparators or comparator buffers not connected to the oscillator 22 is connected to one or the other of the reference voltages provided by the voltage divider 18. In the circuits 10, 12 shown in FIGS. 1 and 2, the inverting input terminal of the first comparator/buffer 24 is connected to the 6.06 VDC reference voltage and the non-inverting input terminal of the second comparator/buffer 26 is connected to the 5.94 VDC reference voltage. In the circuit 14 shown in FIG. 4A, the inverting input terminal of the first comparator 28 is connected to the 6.06 VDC reference voltage and the non-inverting input terminal of the second comparator 30 is connected to the 5.94 VDC reference voltage.

Figure 4A:
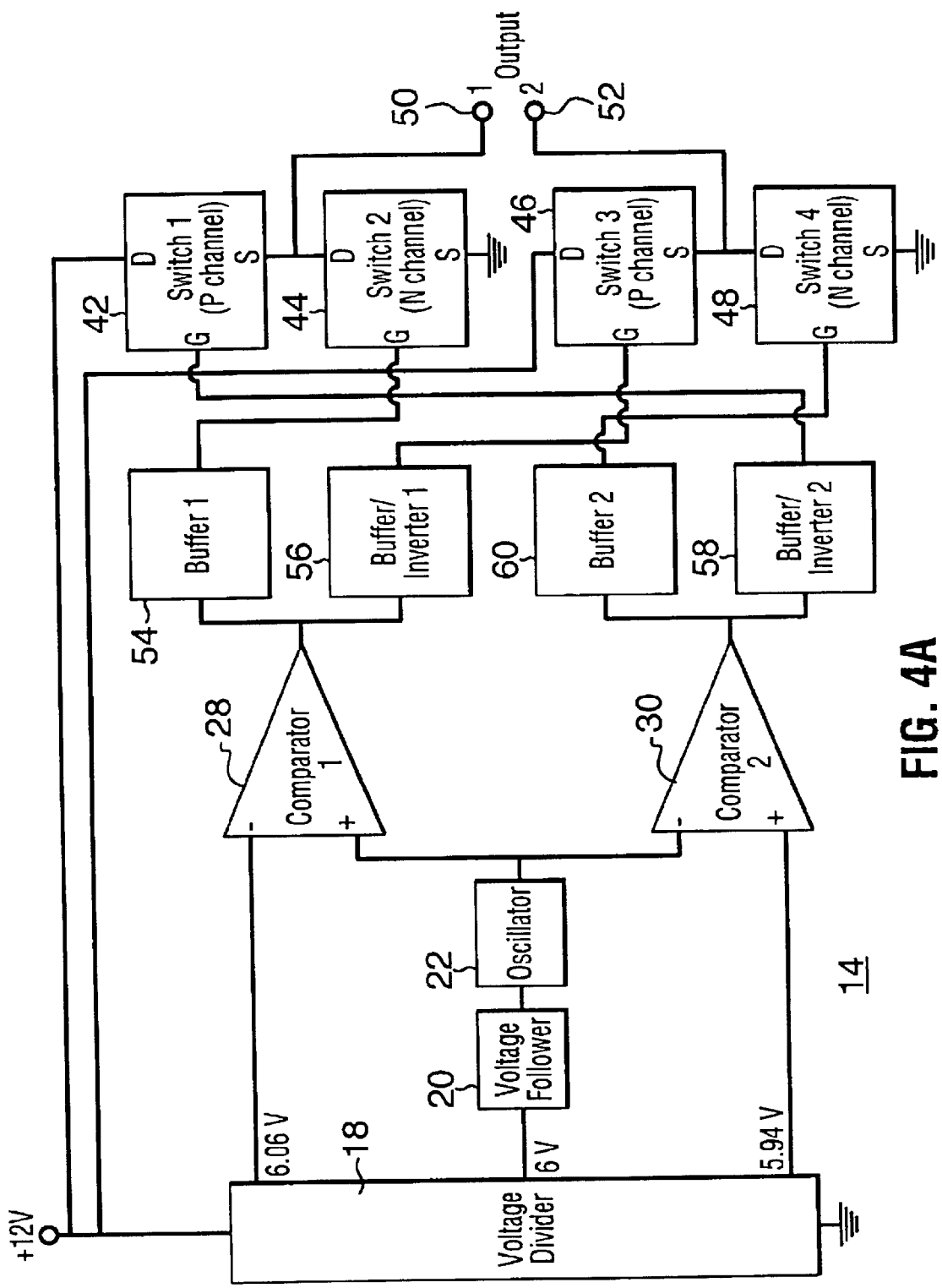
FIGS. 4A, 4B, 4C, and 4D are variants of the block diagram of FIG. 2 in which MOSFETs are used as electronic switches.
Figure 4B:
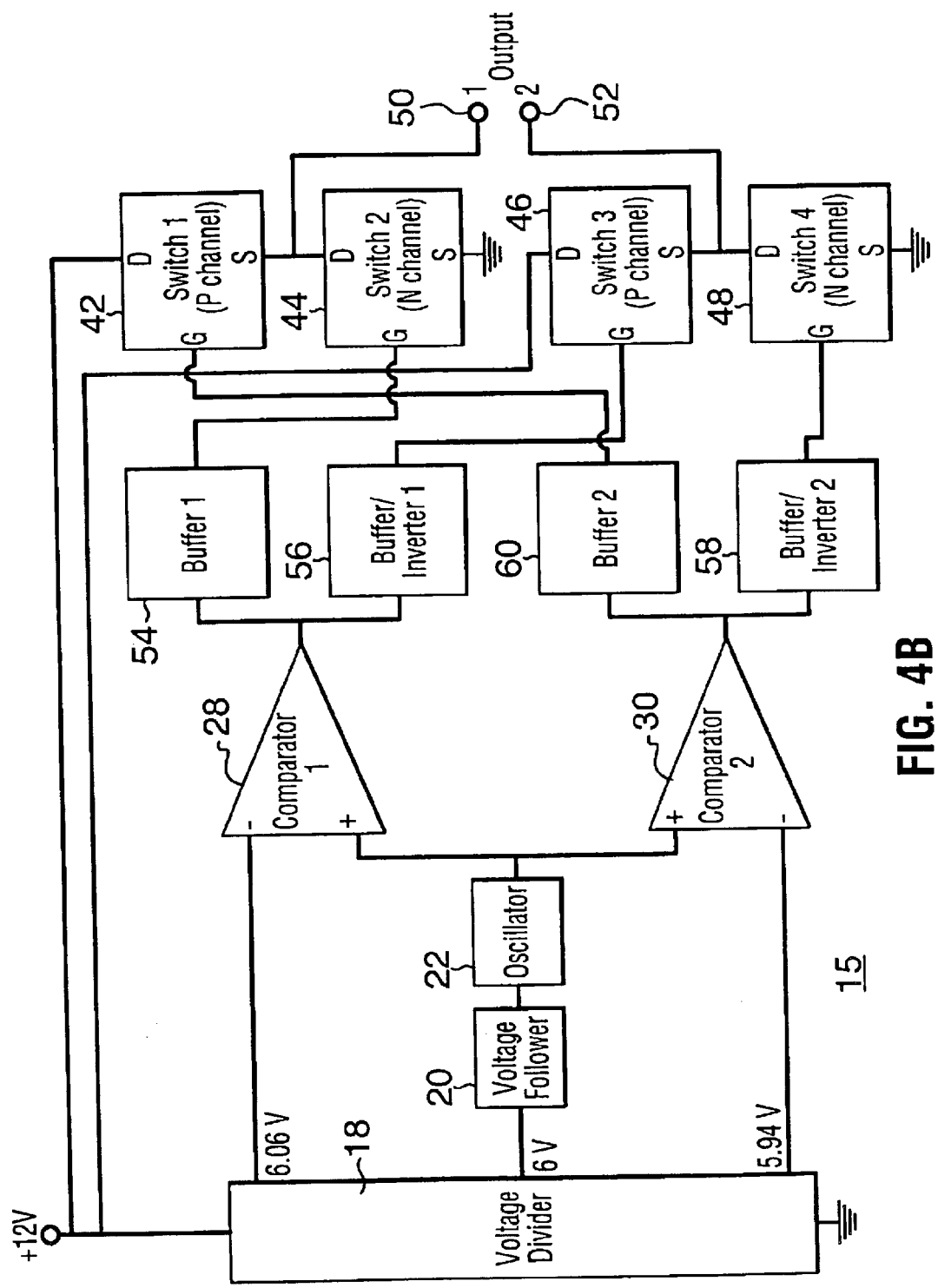

In the circuit 15 shown in FIG. 4B, the inverting input terminal of the first comparator 28 is connected to the 6.06 VDC reference voltage and the inverting input terminal of the second comparator 30 is connected to the 5.94 VDC reference voltage. In the circuit 16 shown in FIG. 4C, the non-inverting input terminal of the first comparator 28 is connected to the 6.06 VDC reference voltage and the non-inverting input terminal of the second comparator 30 is connected to the 5.94 VDC reference voltage. In the circuit 17 shown in FIG. 4D, the non-inverting input terminal of the first comparator 28 is connected to the 6.06 VDC reference voltage and the inverting input terminal of the second comparator 30 is connected to the 5.94 VDC reference voltage. The corresponding connections in circuit 62 shown in FIG. 9 are discussed below.

In the circuit 10 shown in FIG. 1, the comparator/buffer 24 is connected to the control terminal of a first electronic switch 32 and the comparator/buffer 26 is connected to the control terminal of a second electronic switch 34. The electronic switches 32, 34 each have two switched terminals that are effectively connected together when a control voltage is applied to their control terminals. One switched terminal of first electronic switch 32 is connected to a first output terminal 36 and the other switched terminal of first electronic switch 32 is connected to ground. Similarly, one switched terminal of second electronic switch 34 is connected to a second output terminal 38 and the other switched terminal of second electronic switch 28 is connected to ground. A third output terminal 40 is connected to the 12VDC supply voltage. In the application for which the circuit 10 of FIG. 1 was designed, the first and second output terminals 36, 38 are for connection to opposite ends of the winding of a pump motor (not shown in FIG. 1). The third output terminal 40 is for connection to a center tap of the winding of the pump motor.

In the circuit 12 shown in FIG. 2, the comparator/buffer 24 is connected to the control terminal of a second electronic switch 44 and to the control terminal of a third electronic switch 46. The comparator/buffer 26 is connected to the control terminal of a first electronic switch 42 and to the control terminal of a fourth electronic switch 48. The electronic switches 42, 44, 46, 48 each have two switched terminals that are effectively connected together when a control voltage is applied to their control terminals. One switched terminal of first electronic switch 42 and one switched terminal of the third electronic switch 46 are connected to the 12VDC supply voltage. One switched terminal of second electronic switch 44 and one switched terminal of the fourth electronic switch 48 are connected to ground. The other switched terminals of the first electronic switch 42 and the second electronic switch 44 are connected to a first output terminal 50. The other switched terminals of the third electronic switch 46 and the fourth electronic switch 48 are connected to a second output terminal 52. The resulting circuit configuration of electronic switches 42, 44, 46, 48 is commonly referred to as an H-bridge. In the application for which the circuit 12 of FIG. 2 was designed, the first and second output terminals 50, 52 are for connection to a pump motor.

Figure 3:
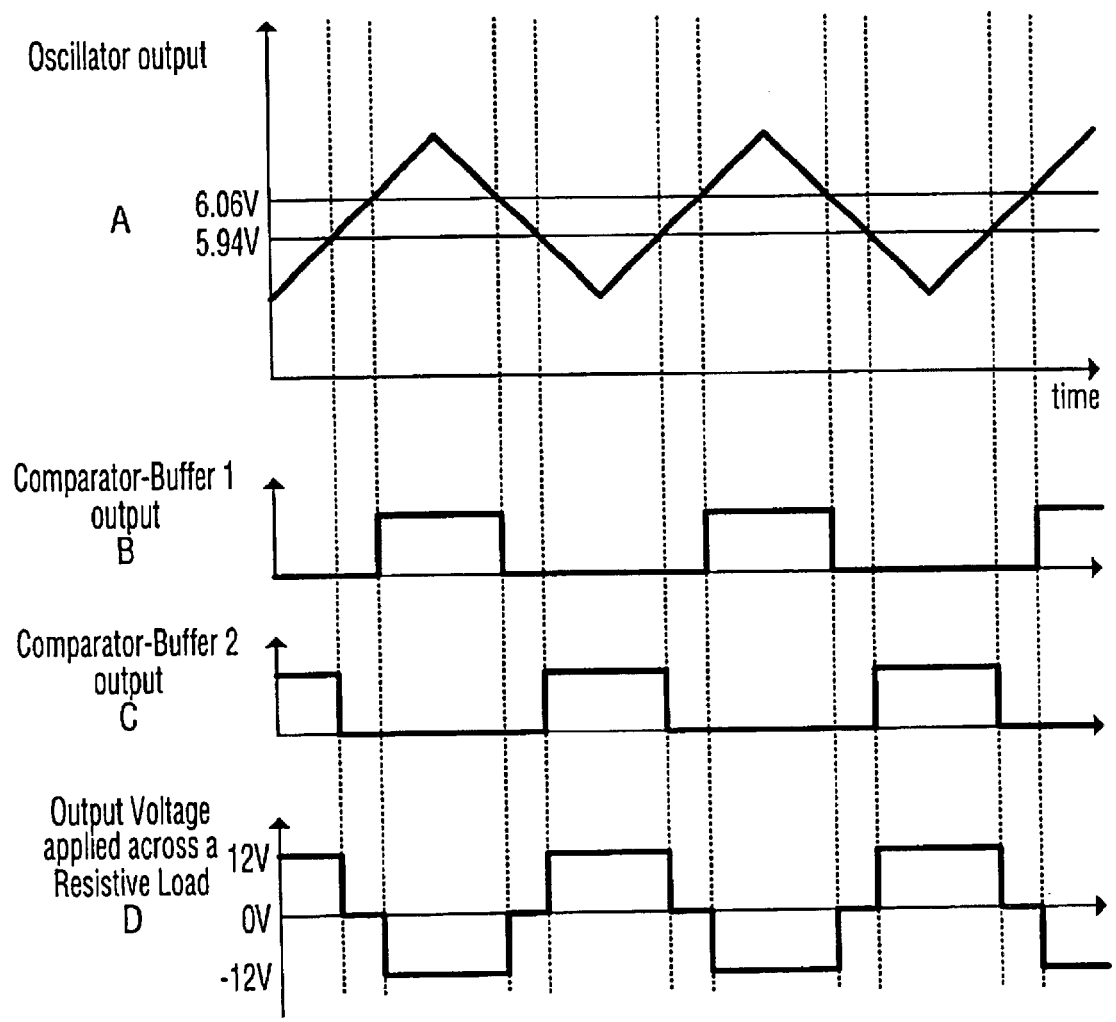
FIG. 3 is an idealized timing diagram of signals that would be measured in the block diagrams of FIGS. 1 and 2 during operation.

FIG. 3 is a combined timing diagram for the circuit 10 shown in FIG. 1 that also applies to the circuit 12 shown in FIG. 2. The output of the oscillator 22 is shown in FIG. 3A and the outputs of the first and second comparator/buffers 24, 26 are shown in FIGS. 3B and 3C, respectively, when the circuit 10, 12 is connected to a 12 VDC supply. The comparator/buffer 24 produces at its output terminal a train of positive-going pulses shown in FIG. 3B each of which lasts from the time that the triangular wave signal shown in FIG. 3A from the oscillator 22 rises above 6.06 VDC and ends when that signal drops below 6.06 VDC The comparator/buffer 26 produces at its output terminal a train of positive-going pulses each of which lasts from the time that the triangular wave signal shown in FIG. 3A from the oscillator 22 drops below 5.94 VDC and ends when that signal rises above 5.94 VDC. As can be seen from FIGS. 3B and 3C, the two trains of pulses alternately go positive and are spaced so that the rise of a pulse from one train is delayed following the fall of the last pulse from the other train.

When the circuit 10 shown in FIG. 1 is provided with a 12 VDC supply voltage and connected to a center-tap winding pump motor at the output terminals 36, 38, 40, then whenever a voltage pulse arrives from the first comparator/buffer 24 at the control terminal of the first electronic switch 32, the first electronic switch 32 closes so as to connect the end of the winding of the pump motor that is connected to output terminal 36 to ground. Conversely, whenever a voltage pulse arrives from the second comparator/buffer 26 at the control terminal of the second electronic switch 34, then the second electronic switch 34 closes so as to connect the end of the winding of the pump motor that is connected to output terminal 38 to ground. The result is that a current will flow, induced by the application of the 12 VDC supply voltage, through half of the winding of the pump motor and to ground through the electronic switch 32, 34 that is closed for as long as the pulse presented to the control terminal of the electronic switch 32, 34 lasts. In operation, a voltage is applied alternately to the control terminals of the electronic switches 32, 34, so that current will alternately flow in opposite directions through alternate halves of the pump motor winding. Due to the delay discussed above, the electronic switches 32, 34 will not be closed at the same time, thereby preventing current from flowing in both halves of the winding at the same time, a situation that would tend to reduce the efficiency of the pump motor. If the pump motor winding were a purely resistive load, the resulting voltage across the output terminals 36, 38 would be as is shown in FIG. 3D.

The operation of the circuit 12 shown in FIG. 2 is somewhat different from that of the circuit 10 shown in FIG. 1, although the timing diagram of FIG. 3 also applies. When the circuit 12 shown in FIG. 2 is provided with a 12 VDC supply voltage and connected to a pump motor at the output terminals 50, 52, then whenever a voltage pulse arrives from the first comparator/buffer 24 at the control terminals of the second and third electronic switches 44, 46, the second electronic switch 44 closes so as to connect the first output terminal 50 to ground and the third electronic switch 46 also closes to connect the second output terminal 52 to the 12 VDC supply voltage. Conversely, whenever a voltage pulse arrives from the second comparator/buffer 26 at the control terminals of the first and fourth electronic switches 42, 48, the fourth electronic switch 48 closes so as to connect the second output terminal 52 to ground and the first electronic switch 42 also closes to connect the first output terminal 50 to the 12 VDC supply voltage. In operation, current will alternately flow in opposite directions through the pump motor winding. Due to the delay discussed above, the first and fourth electronic switches 42, 48 will not be closed at the same time that the second and third electronic switches 44, 46 are closed, thereby preventing current from bypassing the pump motor and flowing directly through in two paths, one through both the first and second electronic switches 42, 44 and the other through both the third and fourth electronic switches 46, 48, a situation that could destroy the electronic switches 42, 44, 46, 48. If the pump motor winding were a purely resistive load, the resulting voltage across the output terminals 50, 52 would be as is shown in FIG. 3D.

However, the circuit 12 shown in FIG. 2 will not operate properly if all N-channel MOSFETs are used as electronic switches 42, 44, 46, 48 because the circuit cannot supply sufficient positive gate voltage. Preferably, P-channel MOSFETs should be used for first and third electronic switches 42, 46, as will now be described in relation to FIGS. 4A, 4B, 4C, and 4D.

The circuit 14 shown in FIG. 4A is a modification of the circuit 12 shown in FIG. 2 in which first and third electronic switches 42, 46 are P-channel MOSFETs and the second and fourth electronic switches 44, 48 are N-channel MOSFETs. In addition, a first buffer 54 has been added between the comparator 28 and the second electronic switch 44, a first buffer/inverter 56 has been added between the comparator 28 and the third electronic switch 46, a second buffer/inverter 58 has been added between the comparator 30 and the first electronic switch 42, and a second buffer 60 has been added between the comparator 30 and the fourth electronic switch 48.

Figure 5:
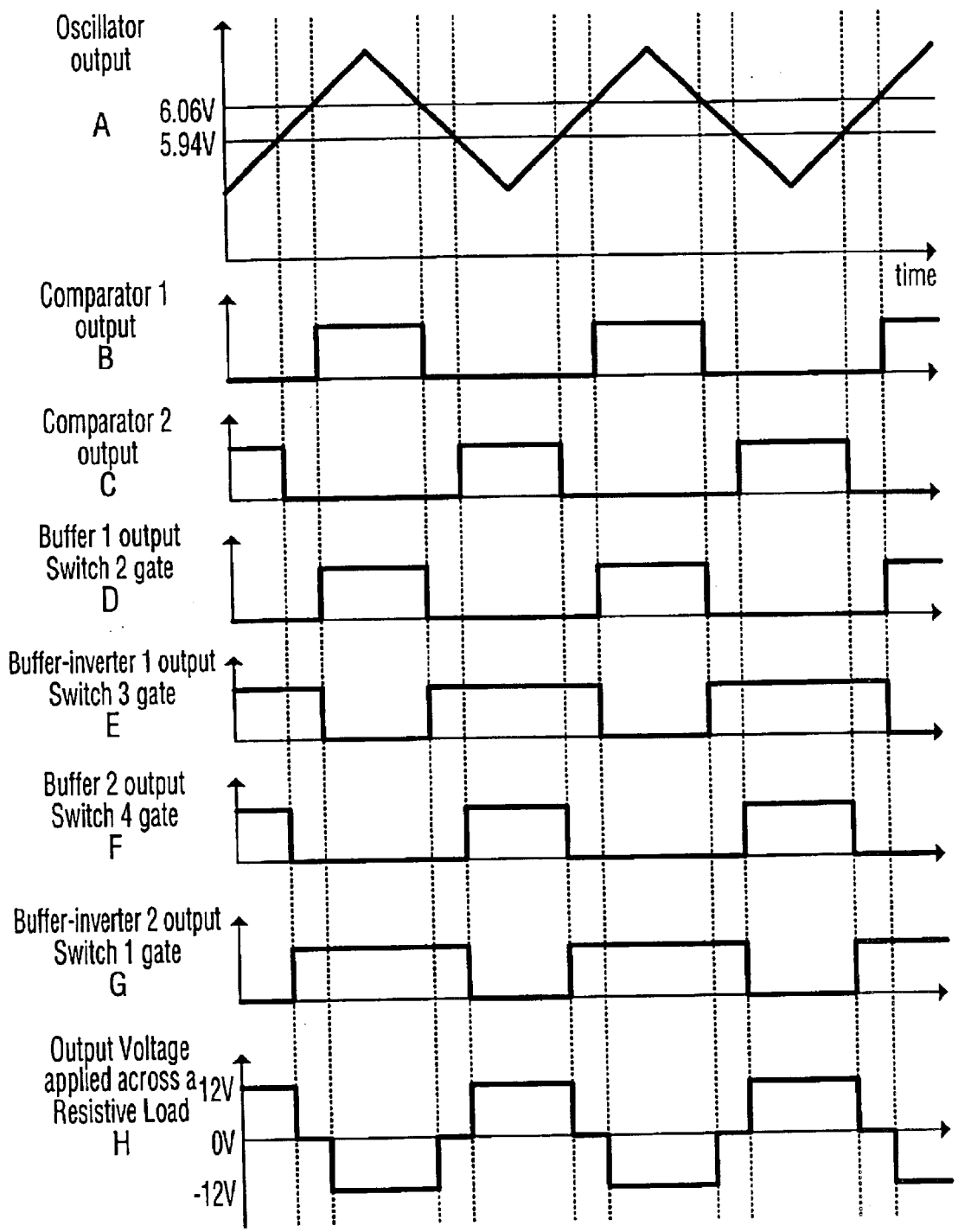
FIGS. 5, 6, 7, and 8 are an idealized timing diagrams of signals that would be measured in the block diagrams of FIGS. 4A, 4B, 4C, and 4D, respectively, during operation.

The operation of the circuit 14 shown in FIG. 4A is similar to that of the circuit 12 shown in FIG. 2, with the exception that pulses to the P-channel MOSFETs used as the first and third electronic switches 42, 46 must be inverted due to the characteristics of P-channel MOSFETs. The first and second buffer/inverters 56, 58 provide the inversion as well as buffering. The first and second buffers 54, 60 simply provide buffering between the comparators 28, 30 and the second and fourth electronic switches 44, 48 as the N-channel MOSFEts used for those electronic switches do not require inversion. FIG. 5 is a timing diagram for the circuit 14. FIG. 5A shows the output of oscillator 22. FIGS. 5B and 5C show the outputs of the first and second comparators 28, 30. FIGS. 5D, 5E, 5F, and 5G show the inputs to the control terminals of the second, third, fourth and first electronic switches, respectively. FIG. 5H shows the output voltage across a resistive load connected between the output terminals 50, 52.

Figure 6:
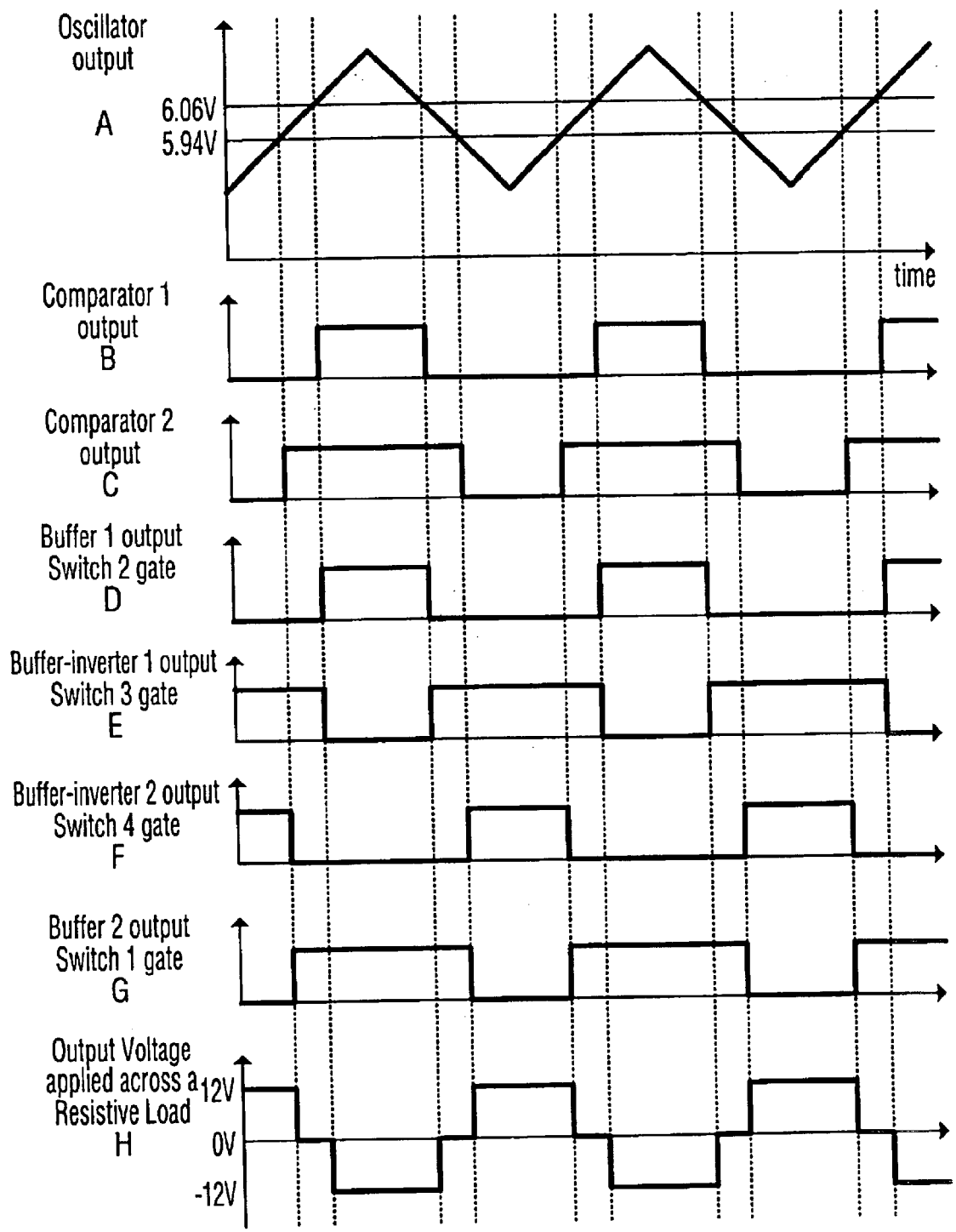

The circuit 15 shown in FIG. 4B is a variant of the circuit 14 shown in FIG. 4A. The only differences are that the inputs of the second comparator 30 have been reversed and the output connections of the second buffer/inverter 58 and the second buffer 60 have been interchanged so that the second buffer/inverter 58 is connected to the fourth electronic switch 48 and the second buffer 60 is connected to the first electronic switch 42. Because the reversal of inputs to the second comparator 30 cancels out the interchanging of the output connections of the second buffer/inverter 58 and the second buffer 60, the resulting pulse train applied to the electronic switches 42, 44, 46, 48 is unchanged. FIG. 6 is a timing diagram for the circuit 15. FIG. 6A shows the output of oscillator 22. FIGS. 6B and 6C show the outputs of the first and second comparators 28, 30. FIGS. 6D, 6E, 6F, and 6G show the inputs to the control terminals of the second, third, fourth and first electronic switches, respectively. FIG. 6H shows the output voltage across a resistive load connected between the output terminals 50, 52.

Figure 4C:
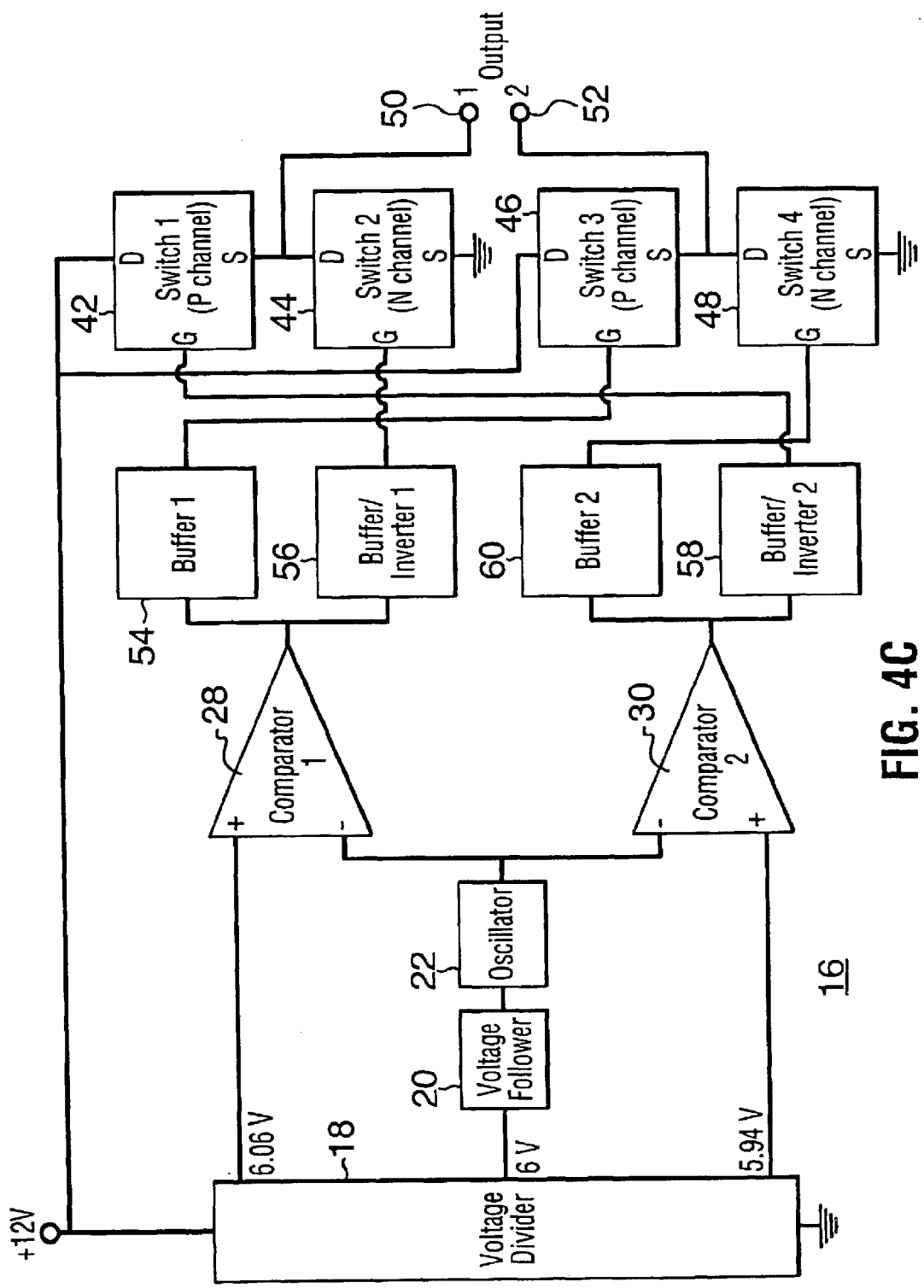
Figure 7:
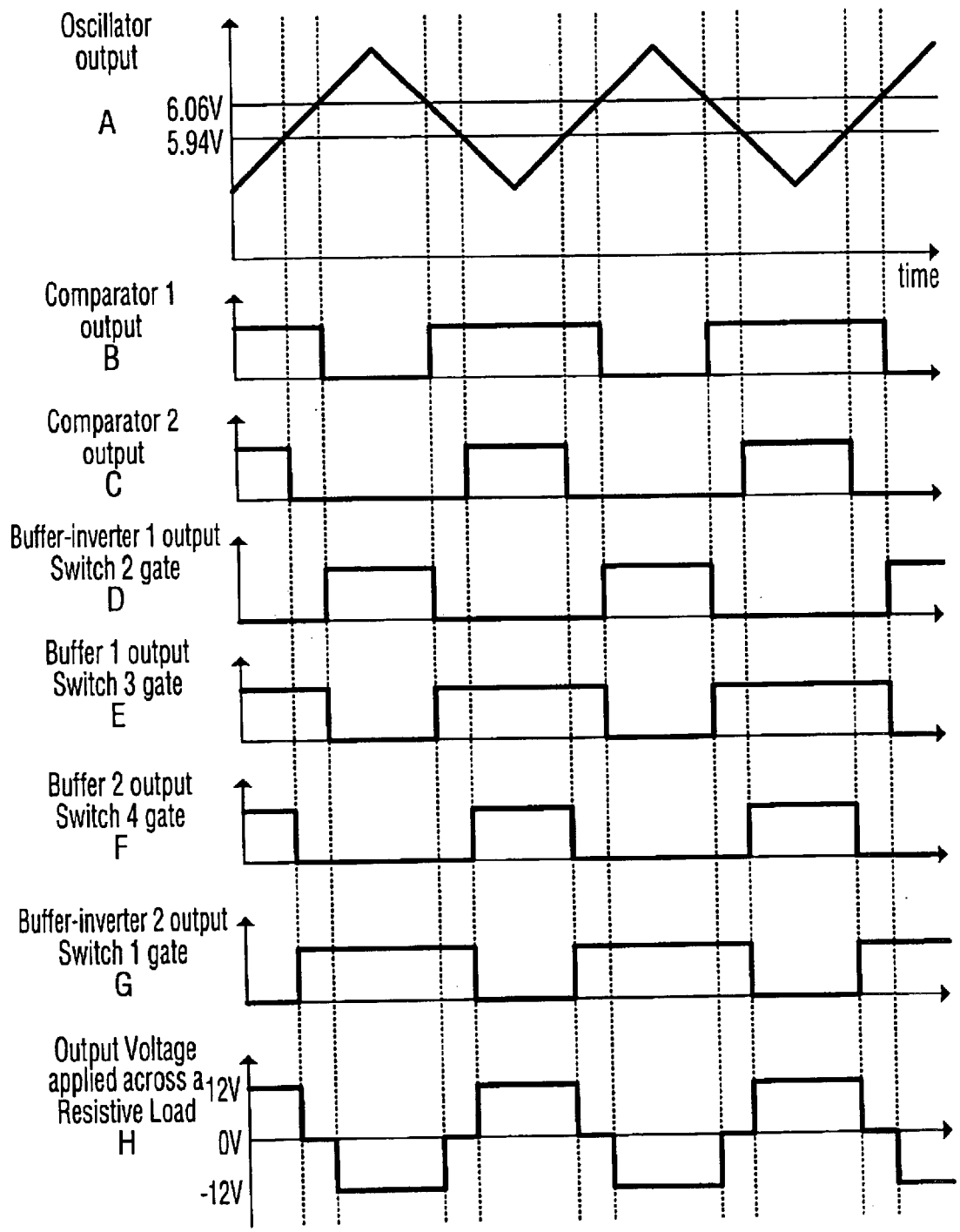

The circuit 16 shown in FIG. 4C is a further variant of the circuit 14 shown in FIG. 4A. The inputs of both the first comparator 28 and the second comparator 30 have been reversed. To provide the same gate signals as provided in circuits 14 and 15, the output connection of the first buffer 54 is connected to the first electronic switch 42, the output connection of the first buffer/inverter 56 is connected to the fourth electronic switch 48, the output connection of the second buffer 60 is connected to the second electronic switch 44, and the second buffer/inverter 58 is connected to the third electronic switch 46. The resulting pulse train applied to the electronic switches 42, 44, 46, 48 is unchanged. FIG. 7 is a timing diagram for the circuit 16. FIG. 7A shows the output of oscillator 22. FIGS. 7B and 7C show the outputs of the first and second comparators 28, 30. FIGS. 7D, 7E, 7F, and 7G show the inputs to the control terminals of the second, third, fourth and first electronic switches, respectively. FIG. 7H shows the output voltage across a resistive load connected between the output terminals 50, 52.

Figure 4D:
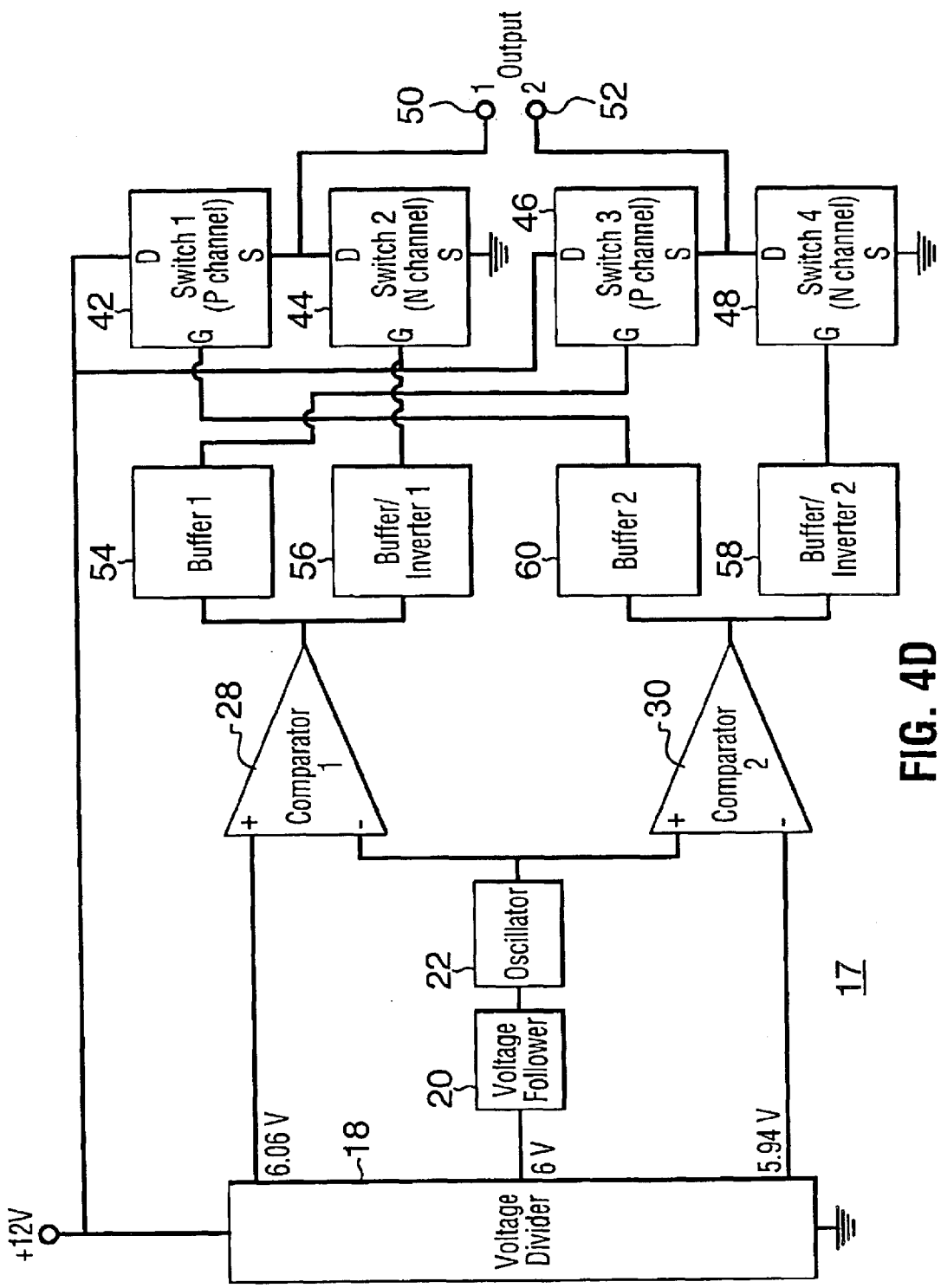
Figure 8:
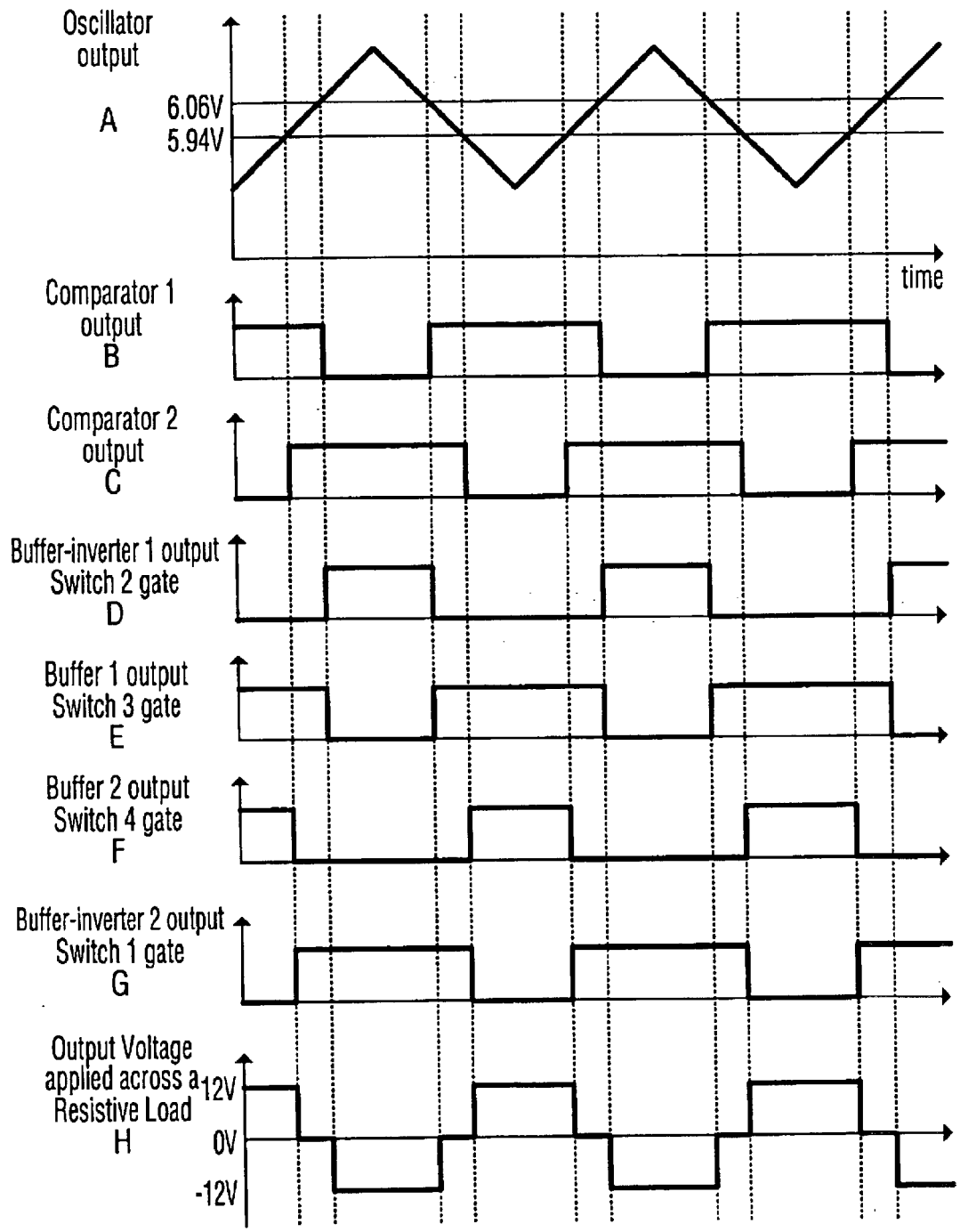

The circuit 17 shown in FIG. 4D is a further variant of the circuit 16. The only differences are that the inputs of the second comparator 30 have been reversed and the output connections of the second buffer/inverter 58 and the second buffer 60 have been interchanged so that the second buffer/inverter 58 is connected to the third electronic switch 46 and the second buffer 60 is connected to the second electronic switch 44. Because the reversal of inputs to the second comparator 30 cancels out the interchanging of the output connections of the second buffer/inverter 58 and the second buffer 60, the resulting pulse train applied to the electronic switches 42, 44, 46, 48 is unchanged. FIG. 8 is a timing diagram showing for the circuit 17 shown in FIG. 4D. FIG. 8A shows the output of oscillator 22. FIGS. 8B and 8C show the outputs of the first and second comparators 28, 30. FIGS. 8D, 8E, 8F, and 8G show the inputs to the control terminals of the second, third, fourth and first electronic switches, respectively. FIG. 8H shows the output voltage across a resistive load connected between the output terminals 50, 52.

In the circuits 14, 15, 16, 17 shown in FIGS. 4A–4D, the buffers 54, 60 are optional, as is the buffering function provided by the buffer/inverters 56, 58. However, buffering is preferred.

FIG. 9 shows another alternative circuit 62 for use with MOSFETs as electronic switches in which four comparators/buffers and no inverters are used. A separate comparator/buffer is used for each MOSFET. The circuit 62 shown in FIG. 9 is identical to the circuits 14, 15, 16, 17 shown in FIGS. 4A, 4B, 4C, and 4D up to the point at which the two reference voltages and the oscillator output are provided to comparators. However, rather than using buffer/inverters 58, 60 to obtain proper gate signals for the P-channel MOSFETs, two additional comparator/buffers are added in parallel with the two comparators used in circuits 14, 15, 16, 17, but with their inputs reversed so as to provide inverted pulses. More specifically, the triangular waveform signal produced by the oscillator 18 is provided to the inverting input terminal of a first comparator buffer 64, the inverting input terminal of a second comparator/buffer 66, the non-inverting input terminal of a third comparator/buffer 68, and the non-inverting input terminal of a fourth comparator/buffer 70. The non-inverting input terminal of a first comparator/buffer 64 and the non-inverting input terminal of a second comparator/buffer 66 are connected to the 6.06 VDC reference voltage and the inverting input terminal of a third comparator buffer 68 and the inverting input terminal of a fourth comparator/buffer 70 are connected to the 5.94 VDC reference voltage. The output of the first comparator/buffer 64 is connected to the gate of the first electronic switch 42, the output of the second comparator/buffer 66 is connected to the gate of the second electronic switch 44, the output of the third comparator/buffer 68 is connected to the gate of the third electronic switch 46, and output of the fourth comparator/buffer 70 is connected to the gate of the fourth electronic switch 48. As in the circuits 14, 15, 16, 17 shown in FIGS. 4A, 4B, 4C, and 4D, the first and third electronic switches are P-channel MOSFETs and the second and fourth electronic switches are N-channel MOSFETs.

Figure 10:
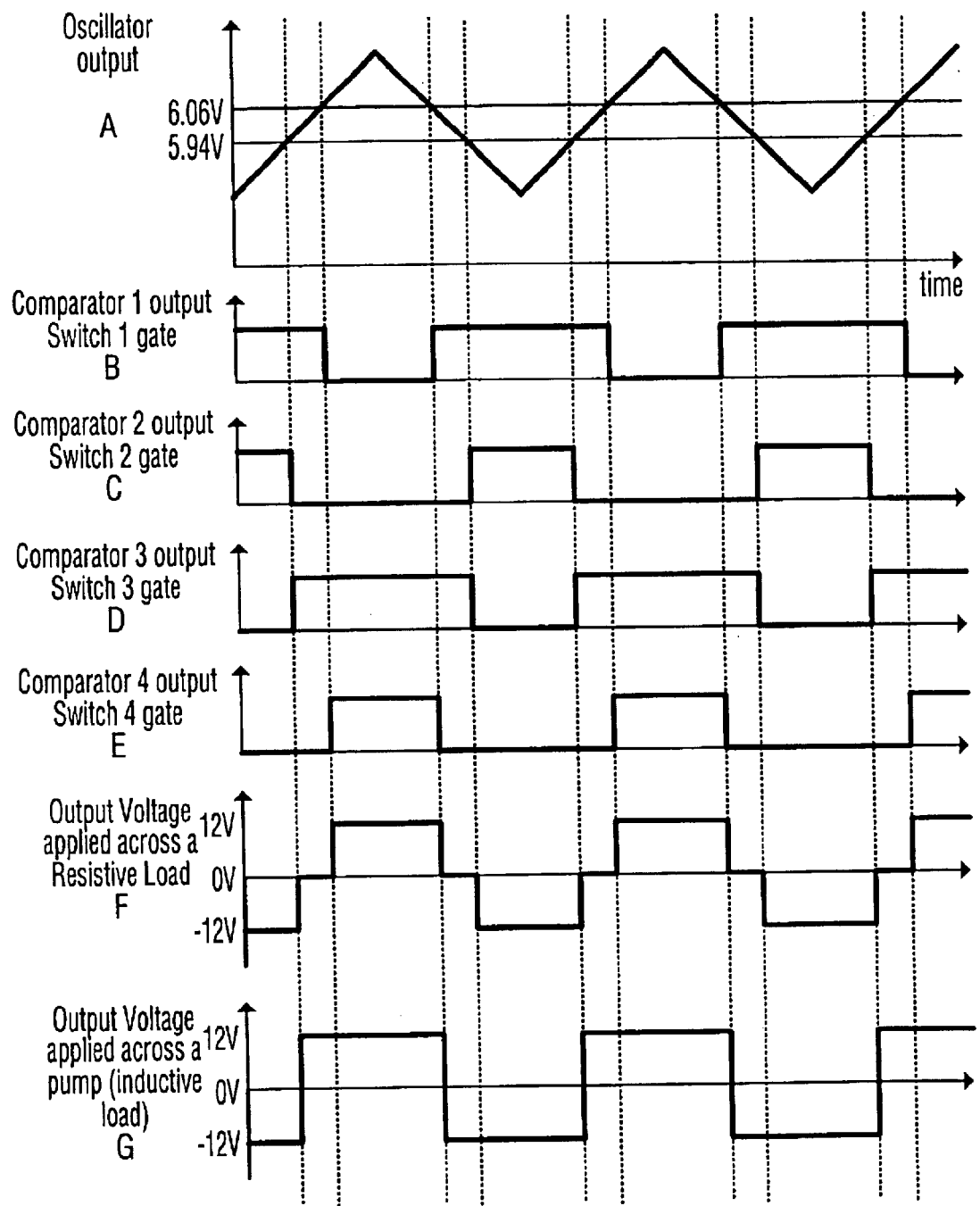
FIG. 10 is an idealized timing diagram of signals that would be measured in the block diagram of FIG. 9 during operation.

FIG. 10 is a timing diagram showing for the circuit 62 shown in FIG. 9. FIG. 10A shows the output of oscillator 22. FIGS. 10B, 10C, 10D and 10E show the outputs of the first, second, third, and fourth comparators 64, 66, 68, 70, respectively, as well as the inputs to the control terminals of the first, second, third, and fourth electronic switches 42, 44, 46, 48, respectively. FIG. 10F shows the output voltage across a resistive load connected between the output terminals 50, 52. FIG. 1G shows the output voltage across an inductive load connected between the output terminals 50, 52.

Figure 11:
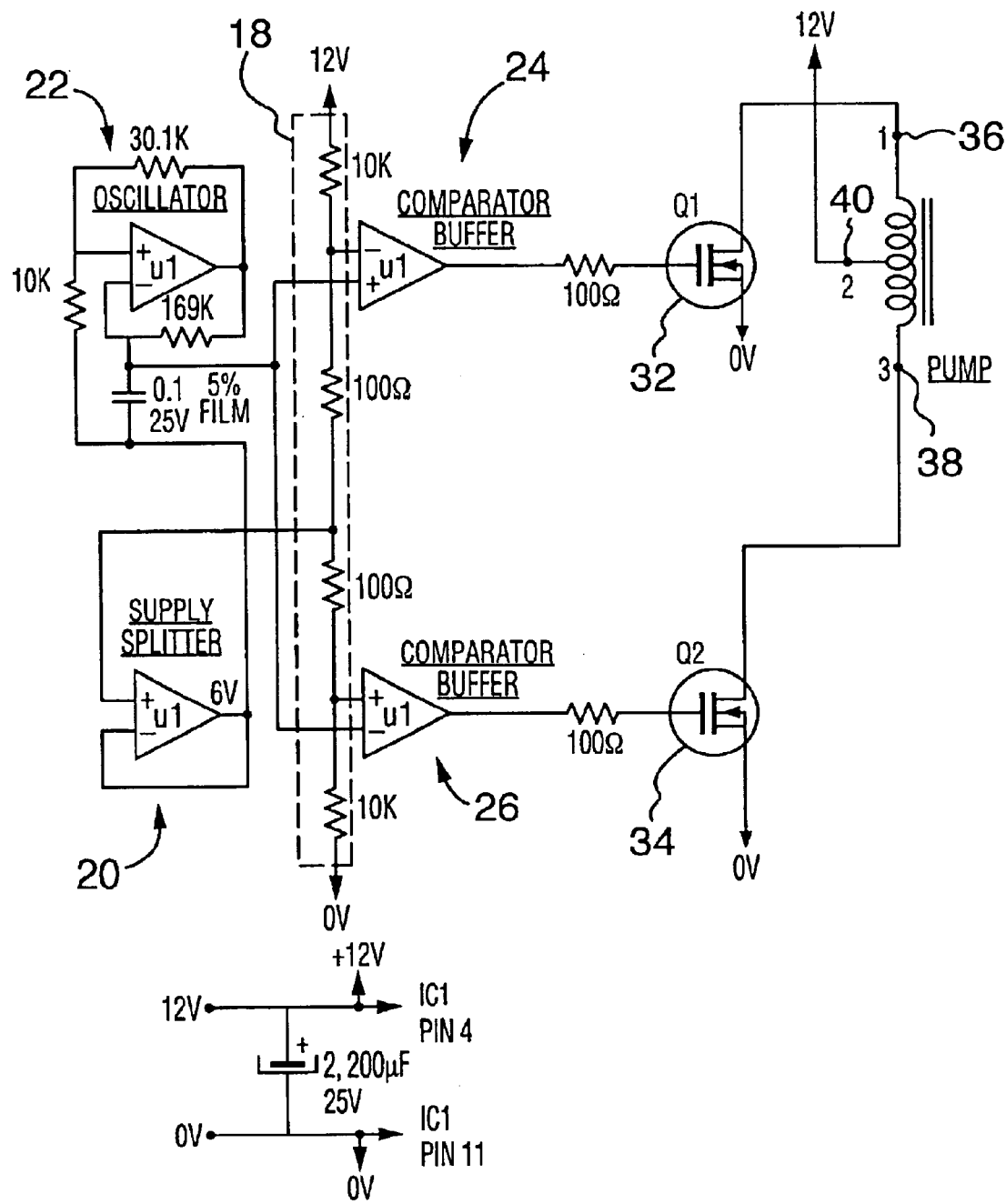
FIG. 11 is an exemplary schematic circuit diagram corresponding to the block diagram of FIG. 1.
Figure 12:
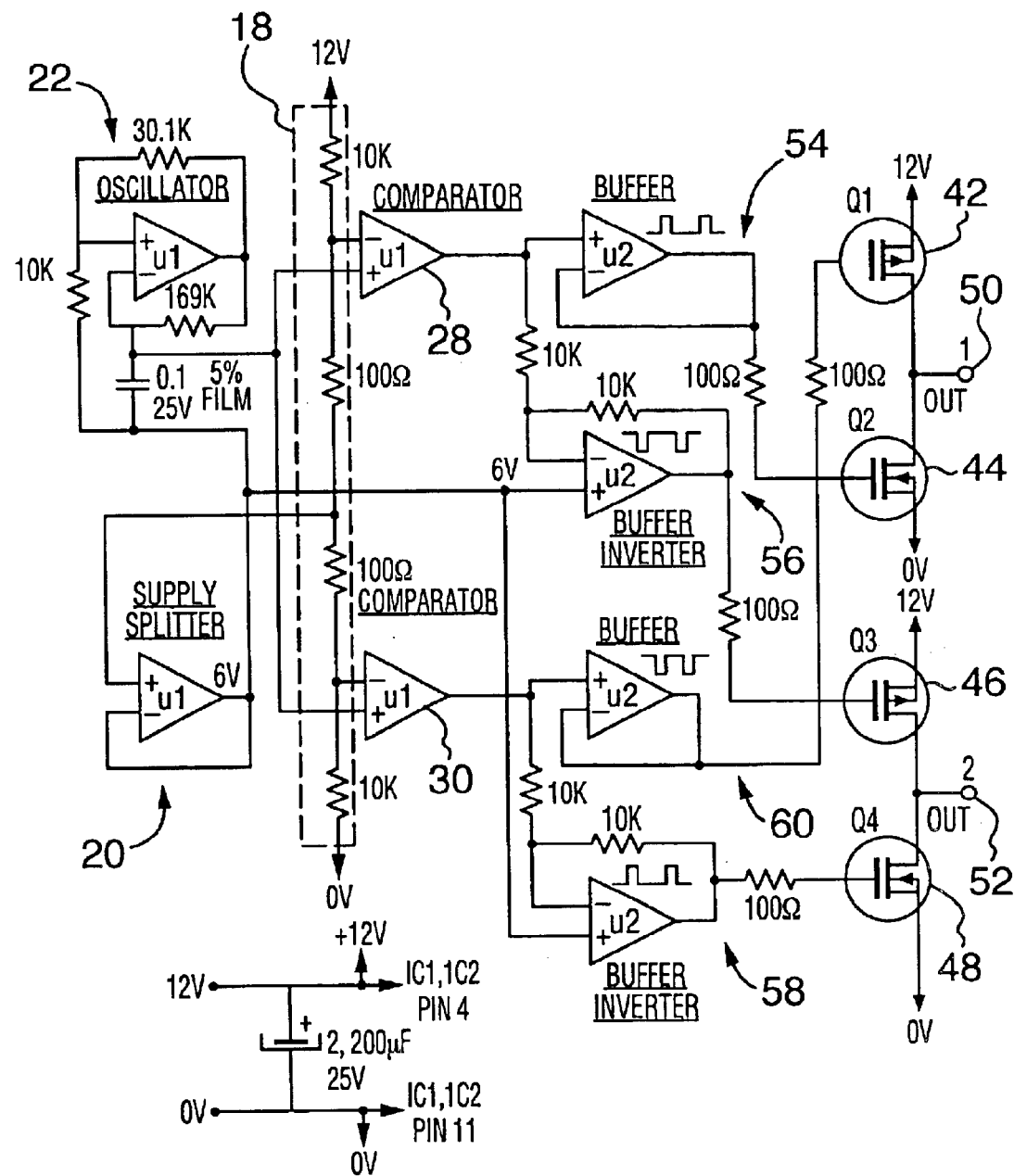
FIG. 12 is an exemplary schematic circuit diagram corresponding to the block diagram of FIG. 4B.
Figure 13:
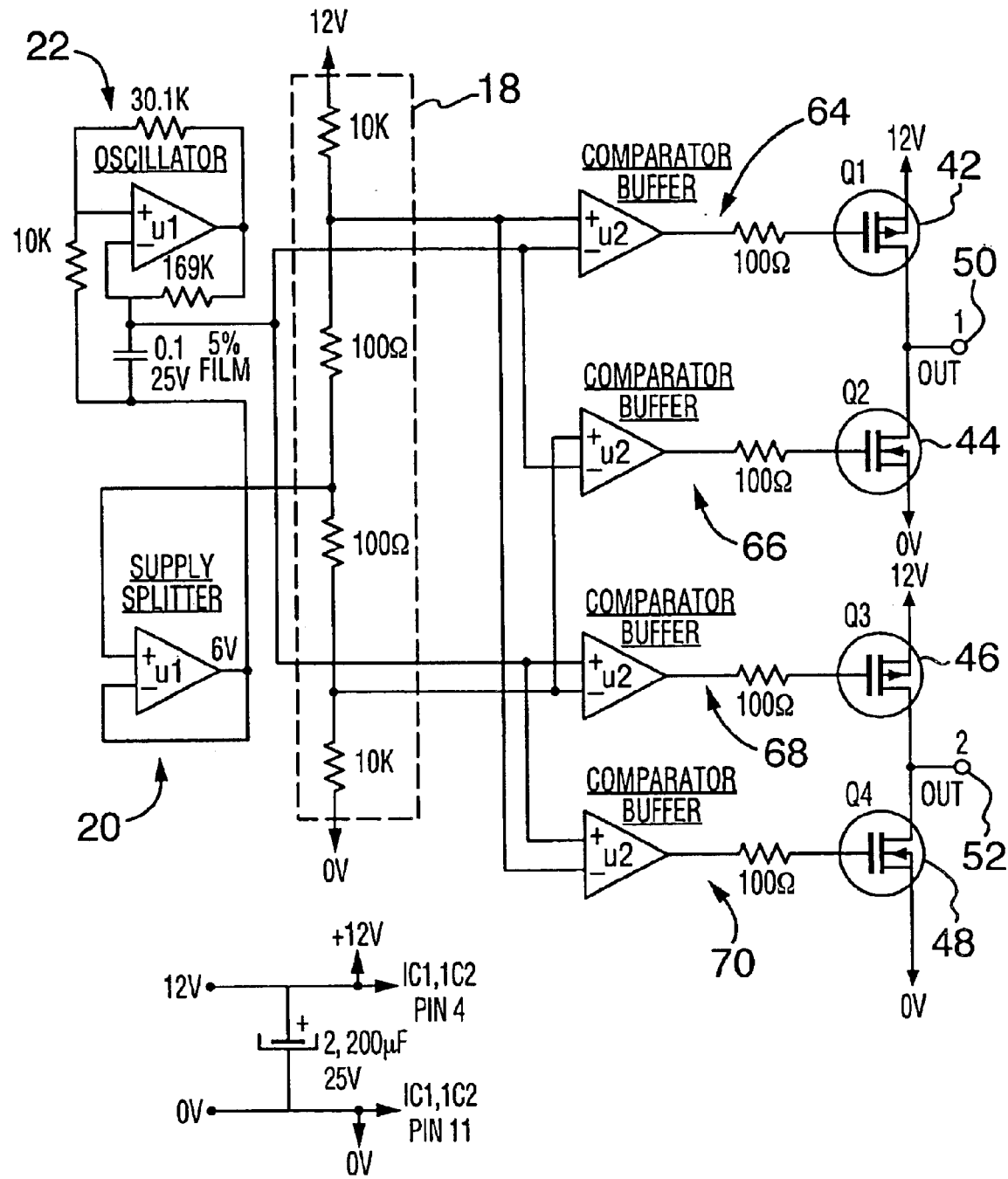
FIG. 13 is an exemplary schematic circuit diagram corresponding to the block diagram of FIG. 9.

FIGS. 11, 12, and 13 are schematic circuit diagrams showing examples of how the circuits 10, 15, 62 shown in block diagram form in FIGS. 1, 4B, and 9 may be constructed. The subcircuits corresponding to the blocks of FIGS. 1, 4B, and 9 are labeled with corresponding reference numerals. All resistors are ¼ watt 1%, unless otherwise indicated. The operational amplifiers are provided by TL084 integrated circuits. In FIG. 11, Q1 and Q2 are IRFZ44N MOSFETs in TO220 cases. In FIGS. 12 and 13, Q1 and Q3 are IRF5305 MOSFETs and Q2 and Q4 are IRFZ44N MOSFETs, all of which are in TO220 cases. Other MOSFETs may be used, as well as other case sizes. The component values shown in the oscillator subcircuit 20 in FIGS. 11, 12, and 13 are selected to provide a 60 Hz triangular waveform reference signal. The circuits 14, 16, 17 shown in block diagram form in FIGS. 4A, 4C, and 4D may be constructed using the same component values.

In the exemplary circuits shown in FIGS. 11, 12, and 13, a resistive voltage ladder is used to provide the voltage divider 18. The resistance of the resistor that connects to the 12V supply and that is shown as a 10K resistor in the resistive voltage ladder in FIGS. 11, 12, and 13 should be adjusted to obtain a triangular waveform at the output of the oscillator that is rising for approximately the same time as it is falling. Otherwise a net DC voltage may develop across the output terminals. Changing the value of that resistor will, of course, change the values of the reference voltages and the DC-offset voltage, but will have little effect on the difference between the reference voltages.

Bipolar transistors may be used rather than MOSFETs in all of the circuits shown. However, as those skilled in the art will understand, external diodes are then required to limit fly-back voltage from an inductive load such as a pump motor winding, and the circuits will be less efficient due to the approximately 0.5 V drop across the bipolar transistors when they are switched on.

All circuits 10, 12, 14, 15, 16, 17, 62 shown in FIGS. 1, 2, 4A, 4B, 4C, 4D, and 9 are designed to be powered by a single polarity 12 volt DC supply, but may be adapted to dual polarity supplies by eliminating the voltage follower 20 and connecting the oscillator to ground. The ground connections shown in those drawings would then be connected to the negative polarity DC supply. For example, if a dual polarity 6 V supply with a ground were available, the +12 V terminal would be connected to the +6 V supply, the ground shown would be connected to the −6 V supply, and the oscillator would be connected to the ground.

The circuits presented herein may be used with advantage in applications other than providing AC power at a fixed frequency to a pump motor. For example, the frequency of the waveform provided by the oscillator may be controlled so as to vary the frequency of the output and slope of the waveform as it crosses the reference voltages may be varied to vary the power output by varying the time during which all of the electronic switches are off. Possible applications may include control of motor speed and light intensity.

Other embodiments will be apparent to those skilled in the art and, therefore, the invention is defined in the claims.

What is claimed is:

1. An electronic circuit, comprising:
a voltage reference source for providing a first reference voltage and a second reference voltage, the first reference voltage more positive the second reference voltage, the voltage reference source including a voltage divider connected between a first DC input terminal and a second DC input terminal, the voltage divider providing the first reference voltage and the second reference voltage, the voltage divider including a resistive voltage ladder providing a DC-offset reference voltage between the first reference voltage the second reference voltage;
a signal generator for generating a reference signal that varies between a maximum voltage that is more positive than the first reference voltage and a minimum voltage that is less positive than the second reference voltage;
a voltage follower connected between the resistive voltage ladder and the signal generator so as to provide the DC-offset reference voltage to the signal generator;
a first comparator connected to the signal generator and the voltage reference source so as to compare the reference signal to the first reference voltage and provide as an output a first series of output pulses each of which lasts during a discrete interval during which the reference signal is more positive than the first reference voltage; and
a second comparator connected to the signal generator and the voltage reference source so as to compare the reference signal to the second reference voltage and provide as an output a second series of output pulses each of which lasts during a discrete interval during which the reference signal is less positive than the second reference voltage.

2. The electronic circuit as defined in claim 1, wherein the output pulses are positive going pulses.

3. An electronic circuit, comprising:

a voltage reference source for providing a first reference voltage and a second reference voltage, the first reference voltage more positive than the second reference voltage, the voltage reference source including a voltage divider connected between a first DC input terminal second DC input terminal the voltage divider providing the first reference voltage and the second reference voltage, the voltage divider including a resistive voltage ladder providing a DC-offset reference voltage between the first reference voltage and the second reference voltage;

a signal generator for generating a reference signal that varies between a maximum voltage that is more positive than the first reference voltage and a minimum voltage that is less positive than the second reference voltage;

a voltage follower connected between the resistive voltage ladder and the signal generator so as to provide the DC-offset reference voltage to the signal generator, a first comparator connected to the signal generator and the voltage reference source so as to compare the reference signal to the first reference voltage and provide as an output a first series of output pulses each of which lasts during a discrete interval during which the reference signal is more positive than the first reference voltage; and a second comparator connected to the signal generator and the voltage reference source so as to compare the reference signal to the second reference voltage and provide as an output a second series of output pulses each of which lasts during a discrete interval during which the reference signal is more positive than the second reference voltage.

4. The electronic circuit as defined in claim 3, wherein the output pulses are positive going pulses.

* * * * *